(12) United States Patent
Brooksher (10) Patent No.: US 12,393,263 B2
(45) Date of Patent: Aug. 19, 2025

(54) SYSTEMS AND METHODS RELATED TO MONITORING, COMMUNICATING, AND/OR ANALYZING BODILY MOVEMENTS

(71) Applicant: Riley J. Brooksher, Alpharetta, GA (US)

(72) Inventor: Riley J. Brooksher, Alpharetta, GA (US)

( * ) Notice: Subject to any disclaimer, the term of this patent is extended or adjusted under 35 U.S.C. 154(b) by 448 days.

(21) Appl. No.: 18/063,667

(22) Filed: Dec. 8, 2022

(65) Prior Publication Data
US 2023/0176646 A1    Jun. 8, 2023

Related U.S. Application Data

(60) Provisional application No. 63/287,171, filed on Dec. 8, 2021.

(51) Int. Cl.
*G06F 3/0483* (2013.01)
*A41D 1/00* (2018.01)
*G06F 3/01* (2006.01)
*G06F 3/0482* (2013.01)
*G06F 3/0486* (2013.01)
*H04M 1/72412* (2021.01)
*H04M 1/72454* (2021.01)

(52) U.S. Cl.
CPC .............. *G06F 3/011* (2013.01); *A41D 1/002* (2013.01); *G06F 3/0482* (2013.01); *G06F 3/0486* (2013.01); *H04M 1/72412* (2021.01); *H04M 1/72454* (2021.01)

(58) Field of Classification Search
CPC ...... G06F 3/011; G06F 3/0482; G06F 3/0486; G06F 1/163; A41D 1/002; H04M 1/72412; H04M 1/72454; A61B 5/747; A61B 5/002; A61B 5/318; A61B 5/6802; A61B 5/6804; A61B 5/01; A61B 5/024; A61B 5/0531; A61B 5/1112; A61B 5/4266; A61B 2562/0219; G08G 1/202; G16H 80/00
See application file for complete search history.

(56) References Cited

U.S. PATENT DOCUMENTS

| | | |
|---|---|---|
| 5,014,719 A | 5/1991 | McLeod |
| 7,292,151 B2 | 11/2007 | Ferguson et al. |
| 7,825,815 B2 | 11/2010 | Shears et al. |
| 8,120,498 B2 | 2/2012 | Dishongh et al. |
| 8,818,751 B2 | 8/2014 | Van Acht et al. |
| 8,988,240 B2 | 3/2015 | Burton et al. |
| 9,770,658 B2 * | 9/2017 | Bentley ................. A63F 13/428 |
| 9,782,104 B2 | 10/2017 | MacEachern et al. |
| 9,997,082 B2 * | 6/2018 | Kaleal ..................... G06T 19/00 |
| 10,105,108 B1 * | 10/2018 | Taptelis ................. A61B 5/747 |

(Continued)

*Primary Examiner* — Cindy Trandai
(74) *Attorney, Agent, or Firm* — Smith Keane LLP (57) ABSTRACT

Systems and methods according to the present invention include a garment outfitted with a primary circuit board and peripheral sensors to collect data on limb movements and orientation and transmit them to a related mobile application. The application involves an orientation process comprising a photo of the user and a user interface-driven marker system. The application also involves a calibration system involving quaternion calculations. Once a user has completed orientation and calibration processes, the application can receive the data, calculate the sensors' positions, and display them on a 2-dimensional model in real-time.

20 Claims, 4 Drawing Sheets

(56) References Cited

U.S. PATENT DOCUMENTS

| | | |
|---|---|---|
| 10,314,536 B2 | 6/2019 | Hansen et al. |
| 10,327,670 B2 | 6/2019 | Etemad et al. |
| 10,357,688 B2 | 7/2019 | Wiebe et al. |
| 10,575,760 B2 | 3/2020 | Houmanfar et al. |
| 10,675,507 B2 | 6/2020 | Cusey et al. |
| 10,709,374 B2 | 7/2020 | Aginsky et al. |
| 10,726,738 B1 | 7/2020 | Li et al. |
| 10,918,332 B2 | 2/2021 | Belson et al. |
| 11,508,474 B2 * | 11/2022 | Hresko ............... G16H 40/60 |
| 2007/0252708 A1 | 11/2007 | Fujisawa et al. |
| 2008/0306412 A1 | 12/2008 | Nieminen et al. |
| 2010/0176952 A1 | 7/2010 | Bajcsy et al. |
| 2013/0203475 A1 | 8/2013 | Kil et al. |
| 2016/0198995 A1 | 7/2016 | Yeung et al. |
| 2016/0232807 A1 | 8/2016 | Ghaffari et al. |
| 2017/0069191 A1 | 3/2017 | Erkkila |
| 2018/0092572 A1 | 4/2018 | Sanchez et al. |
| 2018/0133551 A1 | 5/2018 | Chang et al. |
| 2018/0140902 A1 | 5/2018 | Wiebe et al. |
| 2018/0192918 A1 | 7/2018 | Ives |
| 2018/0192922 A1 | 7/2018 | Boucher et al. |
| 2019/0015046 A1 | 1/2019 | Whitehouse et al. |
| 2019/0038187 A1 | 2/2019 | Letella, Jr. |
| 2019/0046107 A1 | 2/2019 | Jang et al. |
| 2019/0046839 A1 | 2/2019 | Jang et al. |
| 2019/0076699 A1 | 3/2019 | Wiebe et al. |
| 2019/0154723 A1 | 5/2019 | Kacyvenski et al. |
| 2019/0282856 A1 | 9/2019 | Wiebe et al. |
| 2019/0283247 A1 * | 9/2019 | Chang ............... A61B 5/1121 |
| 2019/0306408 A1 * | 10/2019 | Hofer ............... H04N 23/90 |
| 2019/0307404 A1 | 10/2019 | Wiebe et al. |
| 2019/0343459 A1 | 11/2019 | Korzinov et al. |
| 2019/0350496 A1 | 11/2019 | Gong et al. |
| 2019/0374161 A1 | 12/2019 | Ly et al. |
| 2020/0029882 A1 | 1/2020 | Gong et al. |
| 2020/0054249 A1 | 2/2020 | Fukushi et al. |
| 2020/0146594 A1 | 5/2020 | Gong et al. |
| 2020/0206568 A1 | 7/2020 | Hong et al. |
| 2020/0223071 A1 | 7/2020 | Mahoney et al. |
| 2020/0238149 A1 | 7/2020 | Paulk, Jr. et al. |
| 2020/0281508 A1 | 9/2020 | Ren et al. |
| 2020/0281509 A1 | 9/2020 | Ren et al. |
| 2020/0359944 A1 * | 11/2020 | Raisoni ............... A61B 5/742 |
| 2020/0401224 A1 | 12/2020 | Cotton |
| 2021/0030357 A1 | 2/2021 | Wiedenhoefer et al. |
| 2021/0038167 A1 | 2/2021 | Martineau |
| 2021/0195732 A1 * | 6/2021 | Longinotti-Buitoni ............... H05K 3/361 |
| 2022/0054041 A1 * | 2/2022 | Menon ............... G06N 20/00 |
| 2022/0126198 A1 * | 4/2022 | Toro ............... A63F 13/428 |

\* cited by examiner

SYSTEMS AND METHODS RELATED TO MONITORING, COMMUNICATING, AND/OR ANALYZING BODILY MOVEMENTS

RELATED APPLICATIONS

This application claims priority to and the benefit of U.S. provisional patent application No. 63/287,171, filed 8 Dec. 2022, and entitled "Systems and Methods Related to Monitoring, Communicating, and/or Analyzing Bodily Movements," which is incorporated by reference herein in its entirety.

BACKGROUND OF THE INVENTION

The present invention relates generally to animal body (e.g., human body) positioning, and more specifically to systems and methods for sensing, recording, and displaying substantially real-time bodily movements.

Prior known techniques for analyzing bodily movements suffer from previously unrecognized deficiencies. One drawback to prior technologies is a requirement for multiple people to be involved in a process of observing and analyzing bodily movements, and not just the person whose movements are being observed. Accordingly, the art of bodily movement analysis may benefit from a technology that may be used by a single person.

Another drawback to prior techniques is that analysis (e.g., comparison and contrasting between former and latter movements) does not generally happen substantially contemporaneously (or real-time) in connection with the movements being performed. For instance, prior methods may have involved human visual observation of a former bodily movement followed by contemporaneous or delayed notetaking or diagramming. Then, a latter bodily movement would again be visually observed and further notes and diagrams would be generated. Thereafter, the respective notes and diagrams may be compared and contrasted. This time delay can, in turn, result in delay of feedback provided to the person being monitored. While advancements have been made to record bodily movements, such as photographic and video recording, there remain delays in analysis and feedback. Accordingly, the art of bodily movement analysis may benefit from a technology that may assist in data gathering substantially contemporaneously during (and/or substantially contemporaneously with an observation of) a latter bodily positioning or movement to provide substantially real-time feedback to a user.

Still another disadvantage to prior bodily movement technology and techniques is that some of them are not automatic, and therefore rely on human subjectivity or interpretation. Accordingly, the art of bodily movement analysis may benefit from a technology that is capable of automatic movement data capture and analysis without the need for human subjectivity.

It thus may be desirable to provide technology to observe, communicate and/or analyze bodily movements for medical reasons (e.g., to detect changes in range of motion), to monitor and report therapeutic compliance, to analyze athletic performance, and/or to generate motion vectors related to natural human bodily movements for use in other fields, such as human factor engineering, animation, etc.

SUMMARY OF THE INVENTION

Embodiments of apparatus and methods according to the present invention relate generally to systems and methods utilizing sensor devices in conjunction with a mobile computing device to display at least substantially real-time representations of animal body positioning.

Generally, a system according to the present invention includes clothing garment-embedded motion sensing, transmission to a handheld electronic device, and generated display thereof.

Generally, the system includes three main subsystems: a primary circuit board, one or more peripheral sensors affixed to a garment, and a mobile device (e.g., Android or iOS) with an accompanying mobile application. The primary circuit board contains a Bluetooth enabled microcontroller and battery, and is used to communicate with both the mobile device and the peripheral sensors. The peripheral sensor circuit boards are sewn to the garment with preferably conductive thread, and this thread is used to connect to the primary circuit board. These peripheral sensors help determine the orientation of the body segments they are attached to, such as the calves, thighs, and torso. The mobile application accepts peripheral sensor data transmitted by the microcontroller, stores it in a local database (e.g., SQLite), and displays it in real-time for the end user to view.

In use, a garment is augmented with a number of peripheral inertial measurement units (IMUs) to enable recording of body segment position. In the case of pants, for example, an IMU is sewn to each lower leg portion (e.g., for lateral positioning next to the triceps surae (calf muscle)) and each upper leg portion (e.g., for lateral positioning next to the vastus lateralis (outer quadricep) and/or biceps femoris (outer hamstring)). Two IMUs are supported (e.g., by a garment) ex vivo adjacent to the erector spinae (i.e., the lower back) to establish torso angle and lumbar rounding.

A calibration procedure initializes body segment orientation for an individual standing straight, and deviation from each calibration angle is used to determine rotations of each body segment.

A mobile software application (e.g., for a smartphone or other mobile electronic device) has been developed to accompany the augmented garment. The app uses a framework to allow the application to be run on iOS and Android mobile devices using only one codebase (e.g. React Native). It facilitates user interaction with the device and its data in two ways: at least substantially real-time display of limb orientation and record viewing. The real-time display updates limb orientation on a generated model of the human body each time a Bluetooth packet is received by the handheld device from the augmented garment primary circuit board. A complete refresh of the generated model on the mobile device occurs preferably between 20 and 60 times per second, with about 30 times per second providing sufficient substantially real-time viewing. The record viewer allows the user to review previously made recordings, and will be used to report on form during workouts when more functionality has been developed.

An embodiment of a system for monitoring, communicating, and analyzing bodily movements according to the present invention includes a garment configured to be worn on a human body, a circuit board supported by the human body, and a plurality of sensors supported by the garment and in electronic communication with the circuit board. Each sensor is sewn into the garment at a sensor position and the sensors are configured to collect data to track the movements of the human body throughout an activity; The system also includes a mobile phone application and the circuit board communicates the collected data from the sensors to the mobile phone application and the mobile phone application is configured to display the tracked movements of the human body in real time.

According to an embodiment of a system according to the present invention, the circuit board is supported by the garment.

According to another embodiment of a system according to the present invention, the circuit board is flexible.

According to a further embodiment of a system according to the present invention, the circuit board is both flexible and supported by the garment.

According to yet another embodiment of a system according to the present invention, the garment is a pair of pants and the circuit board is supported by the pants proximate the waistline of the pants.

According to still another embodiment of a system according to the present invention, the circuit board is encased within a plastic casing.

According to a still further embodiment of a system according to the present invention, the plastic casing encasing the circuit board is water tight.

According to a yet further embodiment of a system according to the present invention, the circuit board includes a power system, a microcontroller powered by the power system, and a peripheral communication bus controller that enables communication between the microcontroller and the sensors.

According to a yet further embodiment of a system according to the present invention, the power system is a battery.

According to a yet further embodiment of a system according to the present invention, each sensor includes an accelerometer, a gyroscope, and a magnetometer.

According to a yet further embodiment of a system according to the present invention, each sensor is coated in epoxy resin.

According to a yet further embodiment of a system according to the present invention, the sensors are positioned near the triceps surae (calf) and erector spinae (lower back).

According to a yet further embodiment of a system according to the present invention, the sensors are positioned near the vastus lateralis (outer quadricep) or biceps femoris (outer hamstring).

According to a yet further embodiment of a system according to the present invention, the sensors are sewn into the garment using conductive thread, which facilitates the electronic communication between the sensors and the microcontroller.

According to a yet further embodiment of a system according to the present invention, the mobile phone application includes a home page configured to open when the user engages the application, and an activity page featuring a wireless connection/disconnection button and a calibration scan button. The user can navigate between the home page and activity page using a navigation bar. The activity page is configured to display the movement data gathered by the sensors as a real-time movement model.

An embodiment of a method for monitoring, communicating, and analyzing bodily movements according to the present invention includes the steps of providing a garment configured to be worn on a human body, the garment comprising a circuit board and a plurality of sensors supported by the garment. A mobile phone application is downloaded and opened, the mobile phone application comprising a home page configured to open when a user engages the application, an activity page comprising a wireless connection/disconnection button and a calibration scan button, and a navigation bar configured to allow the user to navigate between the home page and the activity page. The garment is donned on the user's body. The application is paired to the garment using an appropriate radio-frequency protocol. The application is calibrated to the garment. An activity is then begun. Each sensor is in electronic communication with the circuit board and the sensors are configured to collect data to track the movements of the human body throughout an activity. The movements of the user's body are communicated by the garment to the application and displayed on the application in real time.

According to another embodiment of a method according to the present invention, the calibration step includes further steps of determining if the user has previously calibrated the application to the user's body segment lengths. Then, if the answer to the determining step is no, the application is calibrated to the body segment lengths of the user. If the answer to the determining step is yes, A previous body segment lengths calibration is selected for the user.

According to still another embodiment of a method according to the present invention, the calibration step includes another step of calibrating the sensors to determine an origin position to begin tracking movements.

According to yet another embodiment of a method according to the present invention, the activity page includes a record button and a database of previously recorded activity data and the step of beginning an activity includes pressing the record button before beginning the activity. The application then records the tracked movements of the user's body.

According to a further embodiment of a method according to the present invention, the method includes a final step of returning at a later time to the recordings database to watch recordings of activities as real-time movement models.

BRIEF DESCRIPTION OF THE DRAWINGS

FIG. 2b is a rear elevation view of the embodiment of FIG. 2a.

FIG. 2c is a right side elevation view of the embodiment of FIG. 2a.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Figure 1:
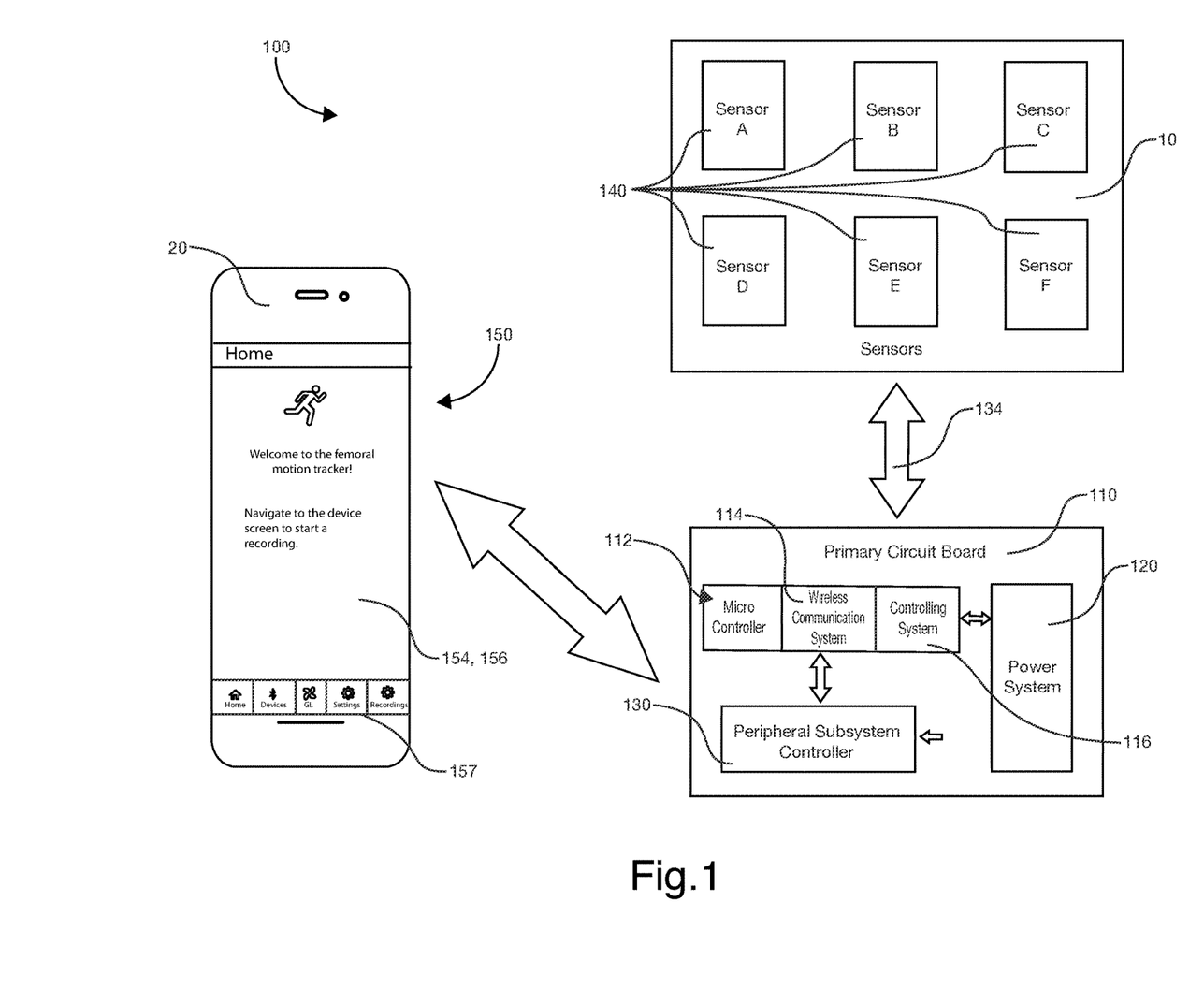
FIG. 1 is a block diagram of a body motion tracking system according to the present invention.

Turning now to Figures, systems and methods for monitoring, communicating, and analyzing bodily movements according to the present invention may be described. In one embodiment, the present invention incorporates a real-time body motion tracking system 100 consisting of a primary circuit board 110, peripheral sensors 140, and a mobile phone application 150. The body motion tracking system 100 tracks positions of at least portions of a user's body by sensing movements, and then a substantially real-time rendering is displayed. Although the current description includes references to this rendition provided by or through a mobile phone application 150, other forms of applications, such as desktop computer applications and videogame console applications, are contemplated as well. The user also has the ability to record movement data and rendition(s) for future analysis. This system and method are useful for a number of applications, including personal analysis of a user's own movements and fitness techniques, data tracking over periods of time, and real-time feedback systems.

In preferred embodiments, a garment 10 incorporates and/or supports both the primary circuit board 110 and the peripheral sensors 140 of the system. Alternatively, the circuit board 110 may be supported by a separate support structure (e.g., support strap) apart from the garment 10, but in any event is preferably supported on an animal body. In this way, the system 100 can actively track the movements of a user's limbs throughout an activity (e.g., random and/or choreographed exercise, movement and/or task). While current embodiments feature conventional (e.g., ABS or fiberglass) circuit boards, other embodiments in which the primary circuit board 110 and the peripheral sensors 140 may be flexible (e.g., polyimide/copper layered films) to allow for the user to easily move without resistance from a rigid board are also contemplated. For the purposes of brevity, embodiments of the present invention will be described with relation to a pair of workout pants representing the garment 10, however other types of garments (e.g. shirts, gloves, shoes, etc.) are also contemplated.

Figure 2A:
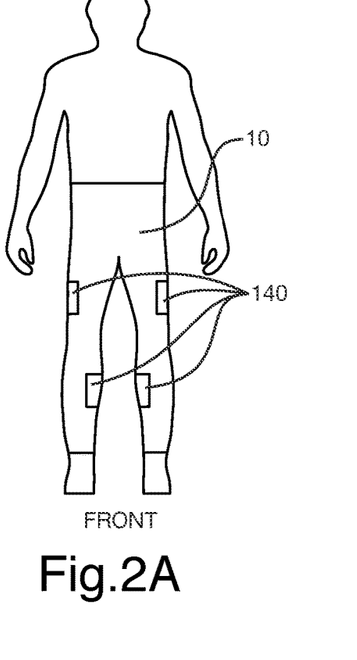
FIG. 2a is a front elevation view of an embodiment of a garment system according to the present invention.
Figure 2B:
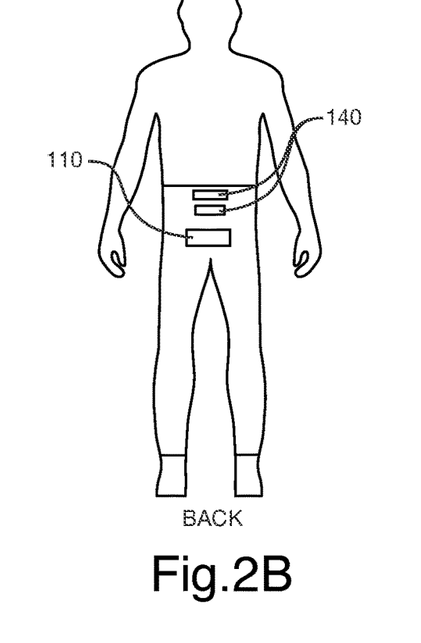
Figure 2C:
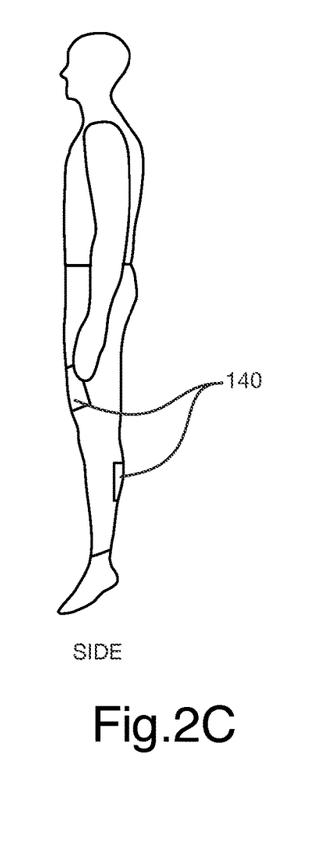

In general, the primary circuit board 110 is preferably affixed to or otherwise supported at or near a waistline of the pants. This support may be accomplished via a pocket sewn into the garment itself for receiving the board 110 or, for example, a plastic casing or sleeve (not shown) supported by (e.g., temporarily clipped or securely affixed) to the garment 10. Such plastic casing may protect the primary circuit board 110 during use, while also allowing a user to remove the primary circuit board 110 from the casing to replace parts when needed or to wash the garment 10. Alternatively, the plastic casing may be watertight and/or hermetically sealed (and may further include a desiccant disposed therein) to enable laundering of the garment 10 without removing the board 110. During use, the primary circuit board 110 preferably serves as a reference point (or origin) for use in calculating and/or determining a respective angle and/or position of the body segment, discussed further below.

The primary circuit board 110 preferably includes a power system 120, a microcontroller 112 powered by the power system 120, and a peripheral communication bus controller 130, enabling communication between the microcontroller 112 and the peripheral sensors 140.

The power system 120 preferably includes one or more lithium-ion battery(ies), although other types of batteries and power source(s) are contemplated for alternative embodiments. A nominal output voltage of the battery may generally be approximately 3.7 volts, and the battery preferably has a capacity of at least about 500 mAh. The actual battery output voltage can fluctuate from around 4.2V to 3.5V, but it may be regulated on the primary board 110, or proximate to the peripheral sensors 140, to about 1.8V (or other voltage) as required by or specified for use with the peripheral sensors 140. The power system 120 also includes a power activation and/or deactivation switch, used to control the supply of power from the lithium-ion battery. When the power switch is activated (i.e. when the switch is turned on), the battery is allowed to power the primary circuit board 110.

When the power switch is turned off (or otherwise using previously existing charging methodologies), the battery may be charged and/or recharged by use of a battery charging circuit and a power connector disposed on the primary circuit board 110. The connector may be a connector known in the art, such as a micro-USB connector, USB connector, or the like. Additionally or alternatively, the circuit board 110 may include circuitry to allow the battery to be charged with a wireless (e.g., inductive) charging device. When the battery needs to be charged, the power connector is connected to an outside power source (not shown), such as a wall outlet, generator, or other electronic device. The power connector is in electronic communication with the charging circuit, such that the circuit may draw power from the outside power source to charge the battery. The charging process of a lithium-ion battery is presently generally understood in the art.

The microcontroller 112 preferably includes a wireless communication system 114 and a controlling system 116. The microcontroller 112 is also in electronic communication with the power system 120 such that the wireless communication system 114 and the controlling system 116 are provided an effective amount of electric power to operate. The controlling system 116 includes a processor known in the art (e.g. an ARM® processor), which is preferably programmable and may control the settings of the charging circuit of the power system 120. The controlling system 116 also preferably controls the functions of the wireless communication system 114, which can utilize Bluetooth® technology, Bluetooth Low Energy (BLE), near field communication (NFC), Wi-Fi™, or any other radio frequency (RF) protocol to connect the wireless communication system 114 to a compatible device. The wireless communication system 114 communicates with a mobile electronic device (e.g., mobile phone), ultimately communicating data to the mobile phone application 150, allowing a steady stream of data transfer between the sensors 140, microcontroller 112, and application 150, preferably contemporaneously with movement of a body wearing a garment 10 according to the present invention.

The microcontroller 112 preferably includes at least a relatively low-cost wireless communication system 114 (e.g. a BT832F Bluetooth® Low Energy module) and a connector (e.g. an SWD connector). The microcontroller 112 sends pre-programmed commands to the peripheral sensors 140 and receives feedback and data from each sensor 140 on its respective position and angle, which may be in relation to an original respective position (calibrated or origin position) of that sensor 140, a comparison to a direction of gravity, comparison to a direction of magnetic north, and/or GPS location from or related to a calibrated or previous location. The wireless communication system 114 communicates with the mobile electronic device (e.g., mobile phone), ultimately communicating data to the mobile phone application 150, allowing a steady stream of at least substantially real-time data transfer between the sensors 140, microcontroller 112, and application 150, again preferably contemporaneously with movement of a body wearing a garment 10 according to the present invention.

The peripheral communication bus controller 130 may include a series of tri-state buffers that communicate with the peripheral sensors 140 located on the garment 10, or each sensor 140 may have its own dedicated bus. The buffers may be oriented or adapted to be used according to a serial communication bus standard (e.g. an I²C bus) that facilitates data transfer between the peripheral sensors 140 and the microcontroller 112. The buffers receive signals from the microcontroller 112 that may prioritize which sensor 140 has control of the bus at any given time to deliver data to the microcontroller 112, the microcontroller 112 thus serving as the bus arbiter.

The peripheral sensors 140 are generally inertial measurement unit pieces that are used to determine the position and orientation with reference to a predefined or previous location of the respective sensor 140, which may then be used to calculate or interpret a position of a user's body, or portion thereof, during activity. During manufacturing, the sensors 140 (including related circuitry) may be mounted on the same piece of material that forms the primary circuit board 110. As such, a sensor base (to support a sensing component and supporting circuitry) may be made of the same material as the primary circuit board 110, the sensor base(s) being separated from the primary circuit board 110 after component placement, such as by cutting. Each sensor 140 includes a sensing component, which includes at least an accelerometer, gyroscope, and magnetometer, among other possible parts. The sensing component may be known in the art (e.g. an ICM 20948 9-axis motion sensor, including a 3-axis gyroscope, a 3-axis accelerometer, and a 3-axis compass) or it may be custom made. The sensor base supports and connects the necessary components to facilitate connection between the sensing component and the primary circuit board 110, and ultimately to the microprocessor 112.

With the sensors 140 positioned on the waistline as a stable reference point, a user may follow a calibration process, more thoroughly discussed below in connection with the mobile application 150, to establish a baseline orientation position of the sensors 140. During activity, the movement of the user's limbs relative to the baseline orientation establishes a vector in three dimensions. This vector position and orientation may then be calculated or represented in quaternions (or representations thereof) and transmitted from the sensors 140 on the peripheral communication bus 130 to the microprocessor 112. The sensors 140 continually run these calculations to update the positions of the limbs, allowing an accurate stream of data transmitting the movement of the sensors (and indirectly, the movement of a user) during activity.

When the system 100 is being assembled, the sensors 140 are disconnected from the primary circuit board 110 and sewn into pre-determined areas (e.g., pockets) of the garment 10 using thread (which may be electrically conductive thread). The areas of the garment 10 that the sensors 140 are sewn into are generally determined by what areas give the optimal data detection for the user's body segment positions, which is generally determined by the type of garment 10 (e.g., sock, pants, shirt, hat, helmet, gloves, sleeve, etc.) being used. Further, during manufacturing, the sensors 140 (including related circuitry) may be coated in an epoxy resin (e.g., potted), both to make the sensors 140 more durable during rigorous use and to protect them from water ingress when the garment 10 is being washed. In the example shown in FIGS. 2A and 2C, one sensor 140 is preferably sewn to or otherwise supported by the garment 10 at each lower leg portion (e.g., for lateral positioning next to the triceps surae (calf muscle)) and each upper leg portion (e.g., for lateral positioning next to the vastus lateralis (outer quadricep) and/or biceps femoris (outer hamstring)). Two sensors 140 are preferably supported ex vivo adjacent to the erector spinae (i.e., the lower back) to establish torso angle and lumbar rounding. The conductive thread preferably electrically connects the peripheral sensors 140 to the microcontroller 112, and may also be used to help keep the sensors in place. The conductive thread may be sewn in when the garment 10 itself is created or may be added later when the system 100 is ready to be implemented into the garment 10. One end of each strand of conductive thread is preferably looped tightly around vias and conductive pads located on the peripheral sensors 140 (e.g., on/in/through the sensor base). The thread is then woven into the pattern of the garment 10. The second end is preferably connected to the primary circuit board 110 to allow electronic communication and data transfer between the systems. In alternative embodiments, the thread securing the sensors 140 to the garment 140 may be non-electrically conductive thread and the garment 10 may further include thin strips of conductive fabric or wires (not shown) instead, to electrically couple the sensors 140 to the microcontroller 112. The conductive fabric is preferably implemented into the fabric of the garment 10, forming some structure thereof.

Figure 3:
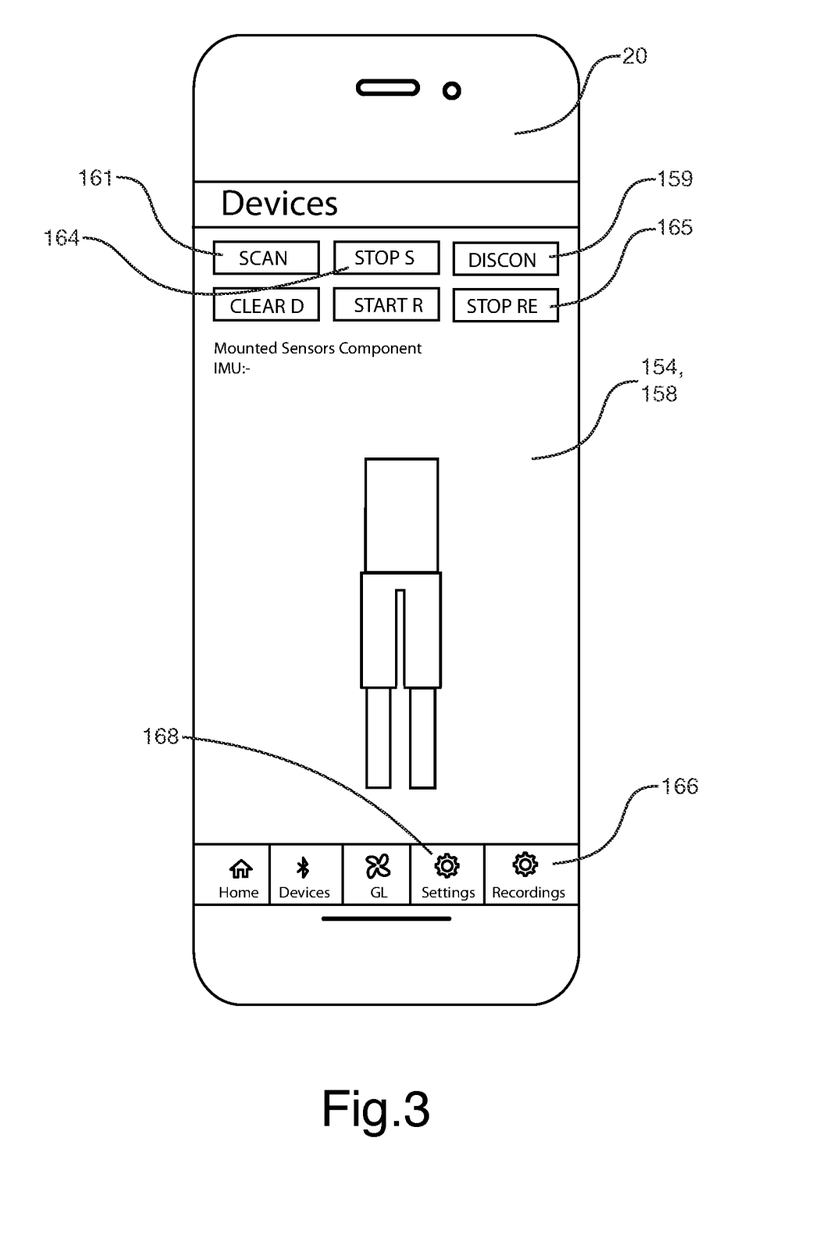
FIG. 3 is a representative user interface display according to the present invention.

A mobile software application 150 has been developed for a variety of uses. The application 150 may be available on iOS and Android mobile devices by remote download, or the application may be recorded on a computer readable medium and provided or packaged with other products (e.g., exercise device(s)) in a kit. When the application 150 is launched on a mobile device 20, a display 154 features options and pages for a user to select. A home page 156 acts as the entry screen for the application 150 and thus the first screen of the display series, with artwork displayed and a navigation bar 157 located at the bottom of the page for the user to navigate to other screens. Turning now to FIG. 3, the application preferably includes an activity page 158, which the user can locate on the navigation bar 157. The activity page 158 features a wireless connection/disconnection button 159, which the user can tap to pair the mobile device 20 with the wireless communication system 114 via Bluetooth®, Bluetooth Low Energy (BLE), near field communication (NFC), Wi-Fi™, or another type of radio frequency (RF) or other wireless protocol. Once connection is established, the user then taps a calibration scan button 161 to facilitate the calibration process.

The calibration process generally begins with calculating or establishing or estimating the user's limb (or other body segment) lengths. First, the user taps the calibration scan button 161 in the mobile application 150, which connects the application 150 to the camera of the mobile device 20 (through device permissions, if necessary). A full body picture of the user to be calibrated is taken, preferably standing straight up, facing the camera, including head and feet in the frame of the picture. This picture may be taken by the user using a time delay function on the mobile device or by another person. Alternatively, a user may take a photo of a previously taken reference photo that has been printed, or the user may select an adequate photo from a database of photos on the mobile device. Next, the user drags and drops positional markers onto specific body points (usually at or proximate a joint, or other desirable reference point) one at a time using the application 150 user interface, forming a two-dimension skeleton model. The user drags and drops position markers, while the application 150 stores the marker as a pair of x-y coordinates on the image's pixel grid. Position markers are preferably positioned at least at or proximate the following locations in the photograph: crown of the head, at least one talocrural (ankle) joint, and the pubic crest. Additional markers are placed at least at or proximate joints of upper and/or lower limbs to be analyzed (monitored and/or recorded). If an upper body is to be analyzed, markers are preferably placed at the following locations: the suprasternal notch (top of the sternum), at least one glenohumeral (shoulder) joint, an elbow joint on the same arm as the at least one glenohumeral joint, and a radiocarpal (wrist) joint on that same arm. Both arms may be mapped in similar fashion. If a lower body or spinal (e.g., lumbar) rounding is to be analyzed, markers are preferably placed at the following locations: at least one coxal (hip) joint, the tibiofemoral (knee) joint on the same leg as the at least one coxal joint, and a talocrural (ankle) joint on that same leg (if not previously marked). In a preferred embodiment, all listed locations are marked.

The user also enters his or her overall height, as measured by conventional or other means. The application 150 includes an algorithm that establishes a pixel to unit distance (e.g. cm or inch) conversion factor based on the height information provided. The application 150 then uses the conversion factor in connection with the placed position markers to approximate the distances between those markers (which are representative of approximate joint positions), displays them in real units for the user to review and/or confirm, and stores them, preferably in nonvolatile memory for later retrieval and use. Accordingly, this calibration procedure may need to be performed only once per user. In future uses of the system 100, the user can select a previously performed limb length calibration to use in new analyses.

Upon completion of the body segment lengths calibration, or selection of a previously completed body segment length calibration, the user then initiates a sensor calibration process for the sensors 140 by tapping a sensor calibration button 164, which may also be located on the activity page 158. If not already paired to the camera(s) on the device, the application 150 then asks the user to allow access to the camera(s). The sensor calibration process begins by instructing the user to stand straight up and face the device camera, with feet positioned hip-width apart and arms relaxed, such that the user's entire body (including head and feet) is visible in the camera frame. Next, the application 150 records a quaternion from each sensor and continues to record quaternions at a predetermined frequency repeatedly while calibration is ongoing during a predetermined calibration time, resulting in a plurality of recorded quaternion values for each respective sensor 140. The mean (average) of these first recorded quaternions for each sensor 140 is calculated and recorded as the initial (or calibration or origin) quaternion of the respective sensor 140. The user can then begin using the system 100 during an activity.

During use, each sensor 140 continues to communicate quaternions to the application 150 and the application 150 calculates the position of each sensor 140 by subtracting the recorded initial quaternion from the in-activity quaternion that the sensor 140 reports. The resulting quaternion describes the rotation from standing position to the current orientation of the user. This rotation is then applied on an at least substantially real-time three-dimension model (e.g., of a human body) displayed on the activity page 158, allowing the user to see movements in a third-person view or mirrored by the model. This sensor calibration process is performed at the beginning of each use of the system 100, or prior to a movement to be analyzed that, as well as other times (or periodically) as needed due to sensor drift, changes in garment position, and other factors that may affect calculations.

Also during use, the activity page 158 (see FIG. 3) facilitates user interaction with the body motion tracking system 100 in two ways. First, the page 158 displays the limb orientation of the user in at least substantially real-time due to the effective contemporaneous data transfer between the application 150 and the microcontroller 112. This allows the user to see movements represented on a mobile device 20 with minimal delay, which is useful for checking technique and movement sequences in a variety of activities (e.g. yoga, sports, stretches, etc.) and/or analyzing stretch or position goals.

Further, the application 150 may optionally include a pose detection and classification method. As the application 150 displays movements in real-time, the pose detection and classification method may compare the movements or stationary position of the user (or a recording thereof) to a pre-saved catalogue of exemplary positions (either model positions or prior user positions). Body segment (e.g., limb or portion thereof) data (or sensor data) with a number (N) of variations for each pose are stored in a 3N-dimensional locality preserving hash (LPH). The method may further utilize an automated machine learning framework (AutoML) to facilitate pose classification (i.e. SensiML™ or Edge Impulse). The AutoML may learn various poses or orientations according to the following procedure. First, a user may activate the AutoML to collect training data for a motion such as swinging a baseball bat, transitioning between yoga poses, performing a physical therapy/weight-lifting exercise, or completing any physical motion, such as stretching or task completion (e.g., occupational mechanics). Such training data includes both the motion being classified and other unrelated motions. The data may then be labelled, segmented, and separated into training, validation, and test data. Through repeated collection of training data, a classification model may be built, trained, and tested using the AutoML framework. To reduce processing power demands on the connected mobile device, the classification model may be exported as a C library to the microcontroller 112 of the system 100, allowing some processing to be completed at the garment 10 and subsequent processing or review to be completed at the handheld device 20. This process also increases the bandwidth of the system 100 when the classification model is used concurrently with the real-time orientation display. In use, a frame of orientation data is stored in the LPH and a nearest neighbor search is performed. If a neighbor pose is found in the LPH, and within a certain variation tolerance, the pose is identified and displayed with the real-time display of the user. The variation tolerance may be experimentally determined and/or hard-coded as a certain pixel distance from the reference pose data and related to a particular sensor 140 or group thereof.

The second way the activity page 158 facilitates user interaction with the body motion tracking system 100 is through a recording button 165. By using this button 165, the user can record movement data from a particular session (multiple movements) or during a particular pose for later review.

The activity page 158 further preferably includes a recording button 165 (e.g., a virtual or soft button). By using this button 165, a user can record movements for later review. The recordings are preferably stored in a local database (e.g. an SQlite database) and are available for viewing on a recordings page, accessible through another menu button 166. Also located on the navigation bar 157, the recordings page button 166 preferably allows the user to re-watch selected recorded activity and save/organize recordings on the mobile device 20. The recordings page may optionally include the ability to transfer recordings to other users having a separate copy of the application 150 or to other devices or an outside storage device via text message, iMessage, email, or a different form of data transfer.

When the user wants to view recorded activity, the recordings page 166 accesses the data storage database. The data storage database is preferably an embedded system that is capable of storing many recordings of activity (e.g. an SQlite database). The database is stored locally on the device 20 and is accessible by the application 150, allowing a user to quickly and easily access recordings stored therein (recorded by that mobile device 20 or a separate device and transferred into the database). The mobile device application 150 further includes a settings selection 168, enabling users to view settings and make changes specific to the application 150.

Figure 4:
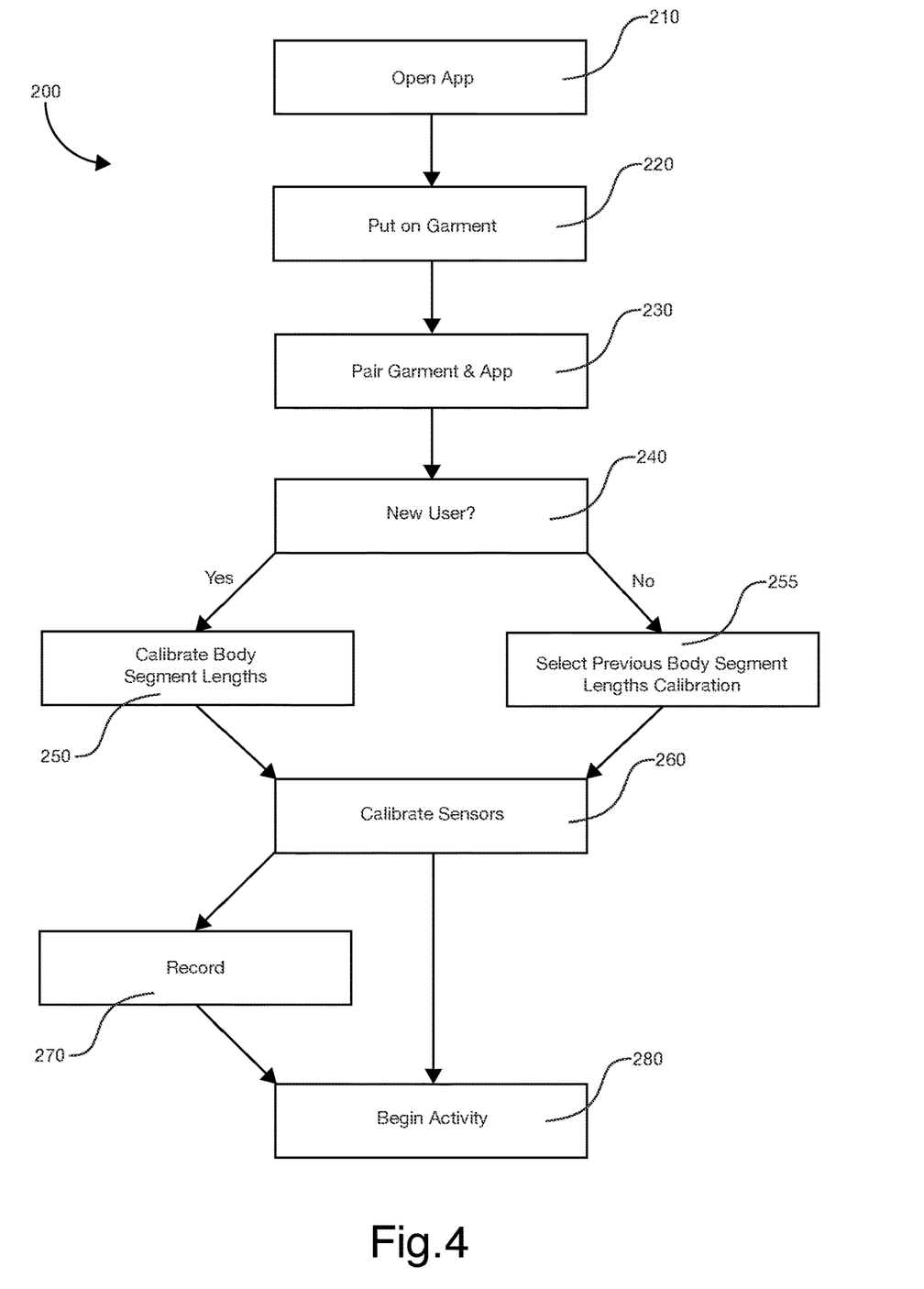
FIG. 4 is a flow chart of an embodiment of a method according to the present invention.

Turning now to FIG. 4, a flow diagram for embodiments of a method 200 for tracking body motion according to the present invention is shown. The method utilizes sensors 140, the mobile device application 150, and real-time viewings and recordings. While the method is shown in stepwise order for clarity, it is to be understood that some of the steps may be undertaken in different chronological order, unless otherwise required. An application 150 is downloaded to a mobile device 20 and opened in step 210. The application 150 is generally available for free download on both iOS and Android stores, allowing a wide variety of users to make use of the system 100 and method 200. In another step 220, a user dons an augmented garment 10, such as the pants example used above. The augmented garment 10 has been manufactured to preferably incorporate a primary circuit board 110, located on the lower back/waist area of the pants, and peripheral sensors 140, located on the calves, quadriceps, and lower back areas of the pants. These parts are preferably attached to the garment 10 or sewn into the fabric to prevent jostling or detachment while the augmented garment 10 is being worn. The sensors 140 are connected to the primary circuit board 110 via the conductive thread that forms patterns and seams in the garment 10, or otherwise operatively connected. In step 230, the user begins the body motion tracking system 100 by powering on the primary circuit board 110, such as by using a switch. On the application 150, the user pairs (or otherwise confirms communication between the primary circuit board 110 and the mobile device 20) using an appropriate RF protocol compatible with the device 20.

In step 240, the user must determine whether or not to perform a body segment lengths calibration process. This decision may depend on whether or not the user has performed the body segment lengths calibration process in the past. If not, or if the user wishes to calibrate again, the user may proceed to step 250 by selecting the calibration scan button 161 and following the body segment lengths calibration process as described more fully above. The application 150 then saves the data from the completed body segment lengths calibration process in the application for later use. If the user has performed the body segment lengths calibration process in the past, a previously stored body segment lengths calibration may be selected in step 255 instead of repeating the body segment lengths calibration process. When body segment lengths calibration is completed or selected, the application 150 may notify the user.

Once body segment lengths calibration process is complete, the user begins the sensor calibration process by pressing the calibration button 164 in step 260. The user then follows the sensor calibration process outlined above and the application 150 alerts the user of a successful calibration. The system 100 is then ready for active use.

After completing calibration in step 260, the user may have a choice of how to use the body motion tracking system 100. The device 20 preferably automatically receives transmissions of sensor position from the primary circuit board 110, allowing the application 150 to provide a real-time display of the garment 10 position. This shows the user a representation of bodily limb orientation. In using the system 100 further, the user can either begin activity and simply view the display 154 showing a real-time model of movements in step 280 and/or the record button 165 may be selected in step 270. If recording, the application automatically catalogs and saves sensor 140 data and the real-time display 154 to the application database. In the final optional step (not shown), the user can return to the database at a later time and watch the recordings of activities as saved as real-time movement models displaying the sensor's transmitted data.

The foregoing is considered as illustrative only of the principles of the invention. Furthermore, because numerous modifications and changes will readily occur to those skilled in the art, it is not desired to limit the invention to the exact construction and operation shown and described. For instance, though the term "real-time" is utilized throughout, it is to be and will be understood by those having skill in the art that there is some finite processing time that is necessary or desirable prior to the real-time result, and the term includes such variability. While the preferred embodiment has been described, the details may be changed without departing from the invention.

I claim:

1. A system for monitoring, communicating, and analyzing bodily movements comprising:
   a garment configured to be worn on a human body;
   a circuit board;
   a plurality of sensors supported by the garment and in electronic communication with the circuit board, wherein each sensor is coupled to the garment at a sensor position and the sensors are configured to collect data representative of movements of the human body throughout an activity; and
   a mobile phone application comprising:
      a home page configured to open when the user engages the application; and
      an activity page comprising a wireless connection/disconnection button and a calibration scan button,
      wherein the user may navigate between the home page and activity page using a navigation bar,
      wherein the activity page is configured to display the movement data gathered by the sensors as a real-time movement model,
   wherein the circuit board communicates the collected data from the sensors to the mobile phone application and the mobile phone application is configured to display the movements of the human body,
   wherein the circuit board supports a power system, a microcontroller powered by the power system, and a peripheral communication bus controller that enables communication between the microcontroller and the sensors, and
   wherein the mobile phone application is calibrated to the user's body segment lengths.

2. The system of claim 1, wherein the display of the movements of the human body occurs at least substantially in real time.

3. The system of claim 1, wherein the circuit board is supported by the garment.

4. The system of claim 3, wherein the circuit board is flexible.

5. The system of claim 4, wherein the circuit board is supported by the garment.

6. The system of claim 3, wherein the garment comprises a pair of pants and wherein the circuit board is supported proximate a waistline of the pants.

7. The system of claim 6, further comprising:
a plastic casing substantially enclosing the circuit board.

8. The system of claim 7, wherein the plastic casing is watertight.

9. The system of claim 6, wherein a first sensor position comprises proximate a triceps surae of the human body and a second sensor position comprises proximate an erector spinae of the human body.

10. The system of claim 9, wherein a third sensor position comprises proximate at least one of a vastus lateralis of the human body and a biceps femoris for the human body.

11. The system of claim 1, wherein the sensors are supported by the garment by sewing.

12. The system of claim 11, wherein the sewing comprises conductive thread and the conductive thread facilitates electronic communication between the sensors and the microcontroller.

13. The system of claim 1, wherein the power system comprises a battery.

14. The system of claim 13, wherein each sensor comprises an accelerometer, gyroscope, and a magnetometer.

15. The system of claim 14, wherein each sensor is coated in epoxy resin.

16. A method for monitoring, communicating, and analyzing bodily movements comprising the steps of:
providing a garment configured to be worn on a human body, the garment comprising a circuit board and a plurality of sensors supported by the garment,
wherein each sensor is in electronic communication with the circuit board and the sensors are configured to collect data representative of movements of the human body throughout an activity;
activating a mobile phone application, the mobile phone application comprising a home page configured to open when a user engages the application, an activity page comprising a wireless connection/disconnection button and a calibration scan button, and a navigation bar configured to allow the user to navigate between the home page and the activity page;
donning the garment on the user's body;
pairing the application to the garment using an appropriate radio-frequency protocol;
calibrating the application to the garment by determining if the user has previously calibrated the application to the user's body segment lengths,
wherein, if the answer is no, calibrating the application to the body segment lengths of the user, and
wherein, if answer is yes, selecting a previous body segment lengths calibration for the user; and
beginning the activity,
wherein the data are communicated from the garment to the application and the movements are displayed on the application.

17. The method of claim 16, wherein the calibration step further includes the step of:
calibrating the sensors to define a sensor origin position.

18. The method of claim 17, wherein the activity page further comprises a record button and a database of previously recorded activity data and the beginning an activity step further comprises the step of:
pressing the record button before beginning the activity, wherein the application records the movements.

19. The method of claim 18, further comprising the steps of accessing the recordings database and displaying a recording of the activity as a real-time movement model.

20. The method of claim 16, wherein the movements are displayed on the application substantially in real time.

* * * * *